A. J. KLONECK.
TIRE FOR VEHICLES.
APPLICATION FILED JUNE 9, 1917.
1,427,302.
Patented Aug. 29, 1922.
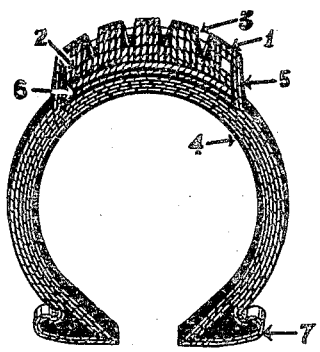
WITNESSES.
INVENTOR.

UNITED STATES PATENT OFFICE.

AUSTEN J. KLONECK, OF NEW YORK, N. Y.

TIRE FOR VEHICLES.

1,427,302.   Specification of Letters Patent.   Patented Aug. 29, 1922.

Application filed June 9, 1917. Serial No. 173,824.

*To all whom it may concern:*

Be it known that I, AUSTEN J. KLONECK, a citizen of the United States, and a resident of New York, in the county of New York and State of New York, have invented certain new and useful Improvements in Tires for Vehicles, of which the following is a specification.

This invention relates to tires for vehicles and has for its object to produce a strong resilient tire.

Another object of the invention is to provide a tire with a wearing surface of loose fibre held together by an elastic cement.

A further object of the invention is to construct a tire of sheets of loose fibre and an elastic binding composition.

Another object of the invention is to form a resilient tire of layers of wear resisting material securely combined in a rubber composition.

A still further object of the invention is to form a tire of layers of perforated material whereby the resiliency of the tire will be increased.

These and other allied objects are attained by a novel combination of parts hereinafter described and shown in the accompanying drawing in which:—

The figure is a sectional view of a hollow tire.

Referring more particularly to the drawing the numeral 1 denotes circular vertical sheets of loose fibre and an elastic binding cement. 2 denotes perforated portions of said sheets, 3 designates openings at the traction surface of said tire, 4 shows tube forming layers of fabric, consisting of woven fibre threads and of an elastic cement such as a rubber composition; 5 are layers of the fabric and rubber, serving to provide a strong connection between the layers 4 and the sheets 1. 6 denotes screens of fibre and metallic wire fabric, serving to prevent cutting of and through said layers by stones and 7 denotes beads adapted to engage the rim of a wheel of a vehicle. The beads of the tire engage the wheel of a vehicle to prevent a slipping of the tire and will be nonextensible so as to prevent an expansion thereof upon the wheel.

In the preferred form, the sheets are composed of rubber and fibre. The latter consisting preferably of a chemically prepared thread, such as a composite or artifical thread of fibre, a material known in the art as fibre or by other trade names and known for its wear resisting qualities. Such fibre thread will be woven to the desired cord and fabric for the mentioned layers 5 and 4.

Having now fully described my invention, what I claim as new and desire to secure by Letters Patent is:—

1. A tire for vehicles including a plurality of layers of fabric and rubber composition forming a tubular opening therein, said tire comprising means at the base for attaching the same upon a wheel, a plurality of layers of rubber cemented fibre attached upon the traction part of said first mentioned layers, wire fabric attached around said first mentioned layers, and layers of fabric and rubber attached to the sides of the first and second mentioned layers adapted for connecting said first and second mentioned layers.

2. A tire for vehicles including a plurality of layers of fabric and a rubber composition forming a tubular opening therein, said layers comprising means at the base thereof for securing the tire upon a wheel, and wire fabric attached to said mentioned layers, a plurality of layers of rubber cemented fibre attached upon the traction part of said first mentioned layers, said last mentioned layers forming alternate projections and recesses at the traction part of the same.

3. A tire for vehicles including a plurality of layers of a fabric and a rubber composition forming a tubular opening therein, said tire comprising means at the rim part thereof for securing the same upon a wheel, said tire being inexpansible at the rim part of said layers and wire fabric attached upon said first mentioned layers, said tire having a traction part of a rubber composition and a wear resisting fibrous material of composite character, and sides of fabric and a rubber cement adapted for connecting said tube forming layers with said traction part of said tire.

4. A tire for vehicles including a plurality of layers of fabric and a rubber composition forming a tubular opening therein, said layers comprising means for attaching the tire upon a wheel, and wire fabric attached to said layers, a plurality of layers of rubber cemented fibre attached to the traction part of said first mentioned layers adapted to increase the wear of the same, said second mentioned layers having a traction part of alternate projections and cavities for preventing slipping of the tire, said fibre employed in the second mentioned layers comprising a chemically composed thread of wear resisting quality.

5. A tire for vehicles including a plurality of layers of fabric and a rubber composition forming a tubular opening therein, including means at the base of the tire suitable for connection with a wheel, said tire being inexpansible at the base, a plurality of layers of rubber cemented wear resisting fibre attached to the traction part of the tire forming thereupon alternate projections and cavities for the prevention of a slipping of the tire, and wire screens arranged around said first mentioned layers, the latter including a thread of a chemical compound of wear resisting material woven to the desired shape.

6. A tire for vehicles including a plurality of layers of fabric and a rubber composition forming a tubular opening therein, including means at the base part for making the same inexpansible and nonelastic, and screens of wire and fabric attached to said layers, and layers of wear reducing material attached to the traction part of the layers of said tire, said fabric of said layers embracing a wear resisting composition fibre thread therefor.

In testimony whereof I hereunto subscribe my name to this specification in the presence of two witnesses.

AUSTEN J. KLONECK.

Witnesses:
S. CHESAID,
SIDNEY RUBENZAHL.